United States Patent [19]
Battaglia et al.

[11] Patent Number: 5,730,046
[45] Date of Patent: Mar. 24, 1998

[54] CHICKEN LEG GRILL RACK

[76] Inventors: John M. Battaglia, 78 McKinley St., Hackensack, N.J. 07601; Mario Battaglia, 440 N. Taylor Ave., So. Hackensack, N.J. 07606

[21] Appl. No.: 743,477

[22] Filed: Nov. 4, 1996

[51] Int. Cl.$^6$ ............................................. A47J 43/18
[52] U.S. Cl. ........................... 99/426; 99/448; 99/450; 426/523
[58] Field of Search .................. 99/426, 427, 448, 99/450, 449; 426/523, 520; 217/60.1

[56] References Cited

U.S. PATENT DOCUMENTS

| | | |
|---|---|---|
| 3,858,496 | 1/1975 | Downers .......................... 99/448 |
| 4,539,455 | 9/1985 | Colato et al. ................. 99/450 X |

*Primary Examiner*—Reginald L. Alexander
*Attorney, Agent, or Firm*—Richard A. Joel

[57] ABSTRACT

A rack for grilling chicken legs in a barbecue and the like comprises a metal surface having downwardly extending support members at both ends and a plurality of predetermined slots to hold chicken legs upside down. The support members position the rack at a spaced distance above a cooking source or fire providing sufficient space for the legs to hang vertically substantially perpendicular to the fire. The slots comprise a plurality of parallel apertures, each including a central circular aperture for insertion of the legs and a pair of narrow elongated slots leading in opposite directions from the circular aperture. The rack may be pivotally mounted to the barbecue so that it moves into position above the fire when the lid is opened or it may be manually placed on the open barbecue. In operation, the chicken legs are inserted through the circular aperture, slid along the slot, and locked in place by the bone at the lower joint. Positioning the legs within the rack provides a uniform cooking surface without the possibility of burning the legs.

8 Claims, 3 Drawing Sheets

CHICKEN LEG GRILL RACK

BACKGROUND OF THE INVENTION

This invention relates to cooking facilities and particularly to a rack for grilling chicken legs in a new and improved manner.

In barbecuing chicken legs, it is extremely difficult to cook the legs uniformly without burning. The legs must be constantly watched and rotated on the grill. Unfortunately, even with considerable attention, it is quite easy to burn the legs or cook the legs in a non-uniform manner. The present invention is designed to permit uniform cooking of a plurality of chicken legs without the problems associated with prior art methods. The invention comprises a unique rack which holds the legs in a vertical position spaced at a predetermined distance above the fire for uniform cooking without the problem of burning.

In the prior art, U.S. Pat. No. 2,269,310, discloses a display device for supporting and displaying axe and shovel handles. The device includes a plurality of spaced parallel slots with openings at one end. The device is for a use different from the present invention and apart from apparent similarity of parallel slots is different in structure.

U.S. Pat. No. 4,554,869 is directed to an adjustable barbecue rack for supporting a plurality of spareribs. The device includes a plurality of racks removably secured to a main rack. Another version of a barbecue rack is shown in U.S. Pat. No. 4,458,585 wherein a cooking surface is defined by spaced rods formed in a particular manner.

Other patents of general interest include U.S. Pat. Nos. 4,677,906; 4,583,647; 4,765,584; 4,184,592; and, 4,542,684. None of the prior art patents mentioned above affect the patentability of the present invention which relates to a unique rack for grilling chicken legs.

SUMMARY OF THE INVENTION

This invention relates to cooking devices and particularly to a device or rack for grilling chicken legs on a barbecue. The prior art devices for grilling chicken legs were generally no more than an open grill where the legs had to be constantly rotated to prevent burning. In the present invention, the legs are suspended from a specially designed rack at a predetermined distance above the fire to permit uniform cooking without burning.

The unique rack of the present invention comprises a flat platform with downwardly extending side portions having tubular legs at the corners to support the rack at a predetermined distance above the fire. The platform includes a plurality of central circumferential apertures and a plurality of slots radiating axially therefrom. The slots are substantially parallel and are used to retain the chicken legs suspended above the fire since the slots are slightly narrower than the lower joint of the legs. The central apertures permit insertion of the chicken legs upside down for uniform grilling. In an optional embodiment, the apertures may be located alternately at opposite ends of the slot which would extend outwardly substantially parallel to end of the rack. The rack may also be pivotally mounted to the barbecue cover or another portion of the barbecue so that it swings into position as the cover is opened or closed.

Accordingly, an object of this invention is to provide a new and improved grilling device for chicken legs.

Another object of this invention is to provide a new and improved barbecue rack for uniformly grilling chicken legs.

A further specific object of this invention is to provide a new and improved barbecue rack wherein a plurality of chicken legs may be mounted in an upside down position with the meaty portion extending downwardly from parallel slots to permit uniform grilling and prevent burning.

A more specific object of this invention is to provide a new and improved rack for grilling chicken legs and the like which is pivotally mounted to the barbecue cover to swing into and out of a cooking position and which includes a plurality of spaced apertures for insertion of chicken legs and parallel slots extending outwardly from said apertures to hold the legs in an upside down position at a predetermined distance above the fire.

BRIEF DESCRIPTION OF THE DRAWINGS

The above and other objects and advantages of the present invention may be more clearly seen when viewing in conjunction with accompanying drawings wherein.

DETAILED DESCRIPTION OF THE INVENTION

Figure 1:
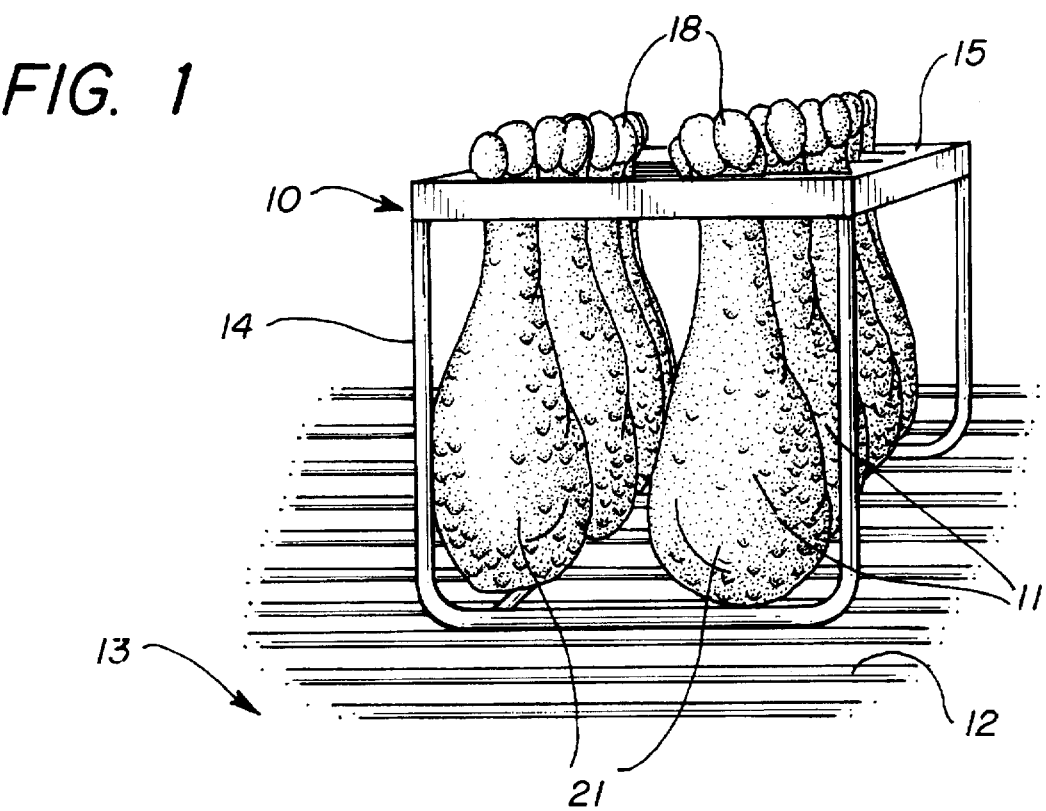
FIG. 1 is a perspective view of the invention showing the chicken legs suspended above a grill.
Figure 3:
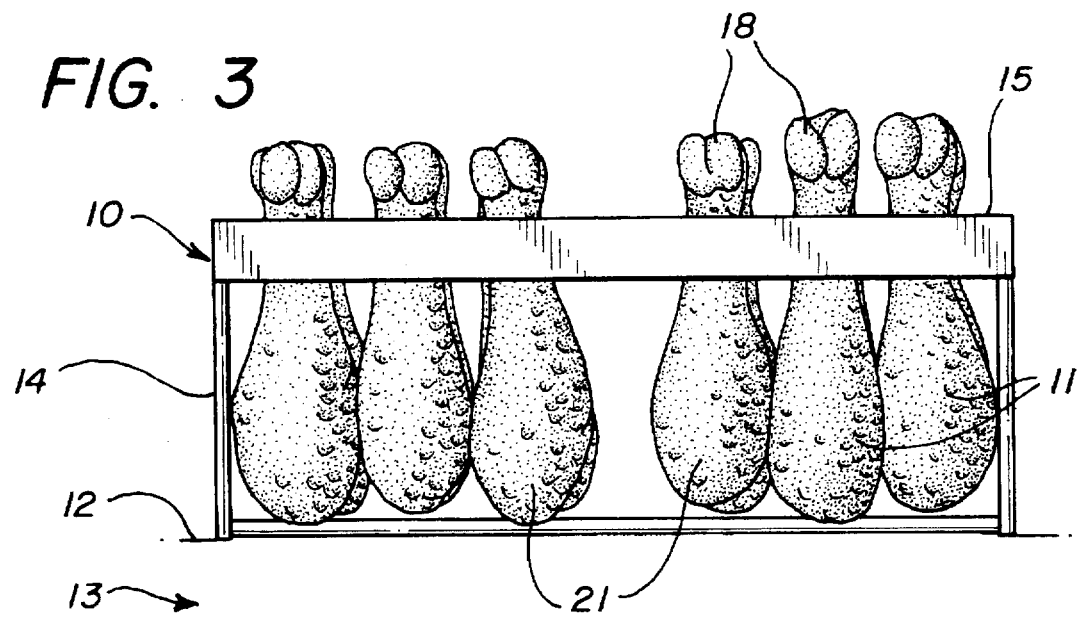
FIG. 3. is a side view of the invention with the chicken legs suspended from the rack; and, FIG. 4 is a perspective view of the invention showing the rack coupled to the barbecue for movement with the hood.
Figure 2:
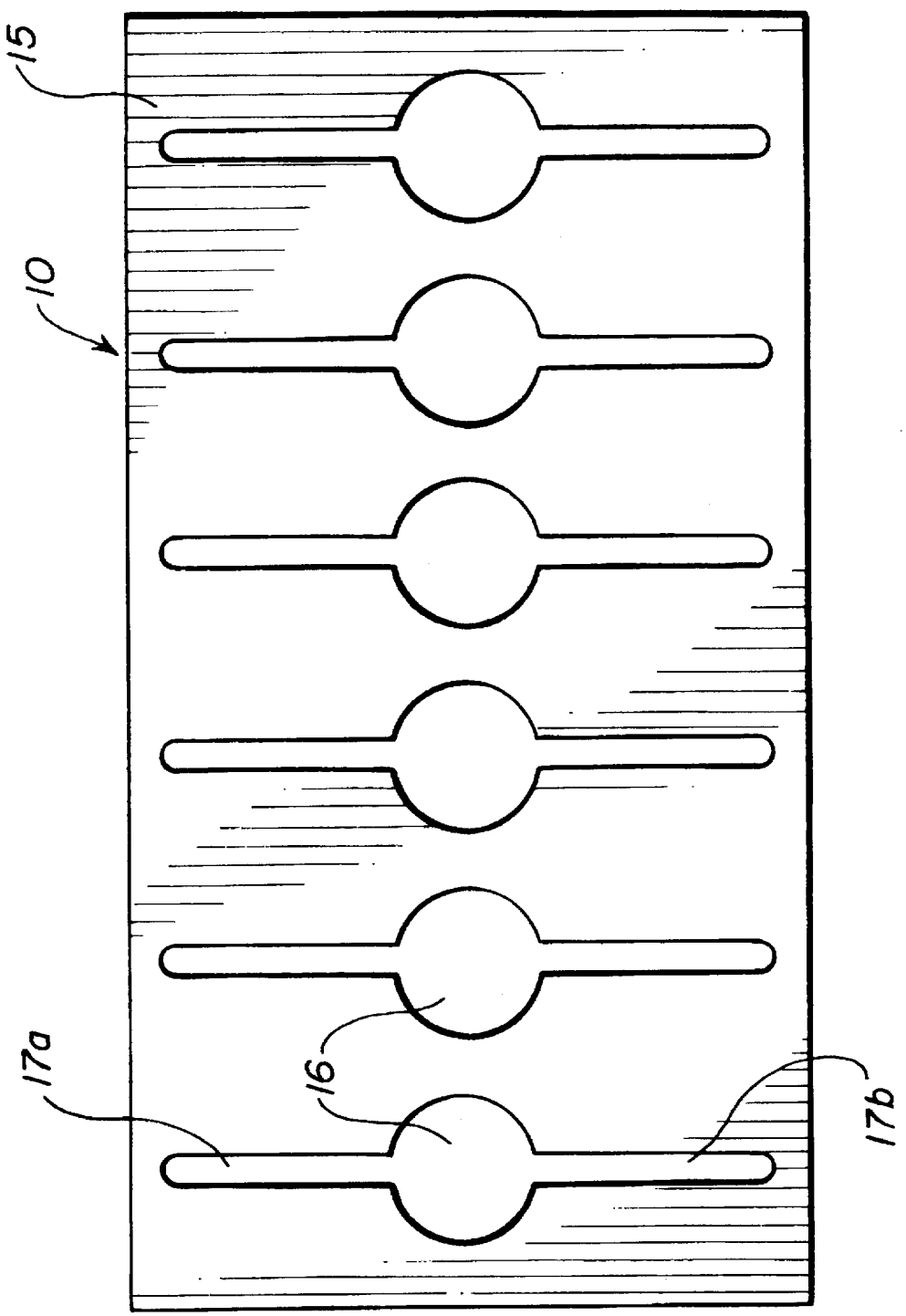
FIG. 2 is a top view of the invention illustrating the mounting slots on the rack comprising the invention.

Referring now to the drawings, the invention comprises a rack 10 for grilling chicken legs 11. The rack 10, as shown in FIG. 1, is designed to rest on a grilling surface 12 in a barbecue 13. The downwardly extending support elements 14 position the upper surface 15 of the rack 10 at a predetermined distance above the grilling surface 12. The support members 14 at each end may comprise substantially U-shaped members with a cross member resting on the grill 12. The rack 10 also includes a flange 26 extending downwardly from the upper surface 15 with the support members 14 being mounted in the corners thereof.

The upper rack surface 15 comprises a plurality of central apertures 16 which may be anywhere from 4 to 6 in number in a conventional design. The aperture diameters are approximately 2¼ inches to permit passage of the meaty portion 21 of the chicken leg 11 therethrough. Extending outwardly on diametrically opposed sides of the apertures 16 are elongated slots 17a and 17b which are approximately ⅝ inches wide and are designed to hold the legs 11 with the leg joints 18 on one side thereof and the meaty portions 21 of the legs 11 extending downwardly. Since the leg joints 18 are normally larger than the slots 17a, 17b, the legs 11 are held in position by the slots 17a, 17b. Thus the drippings fall into the fire (not shown) without causing a flare-up which would burn the legs 11.

Figure 4:
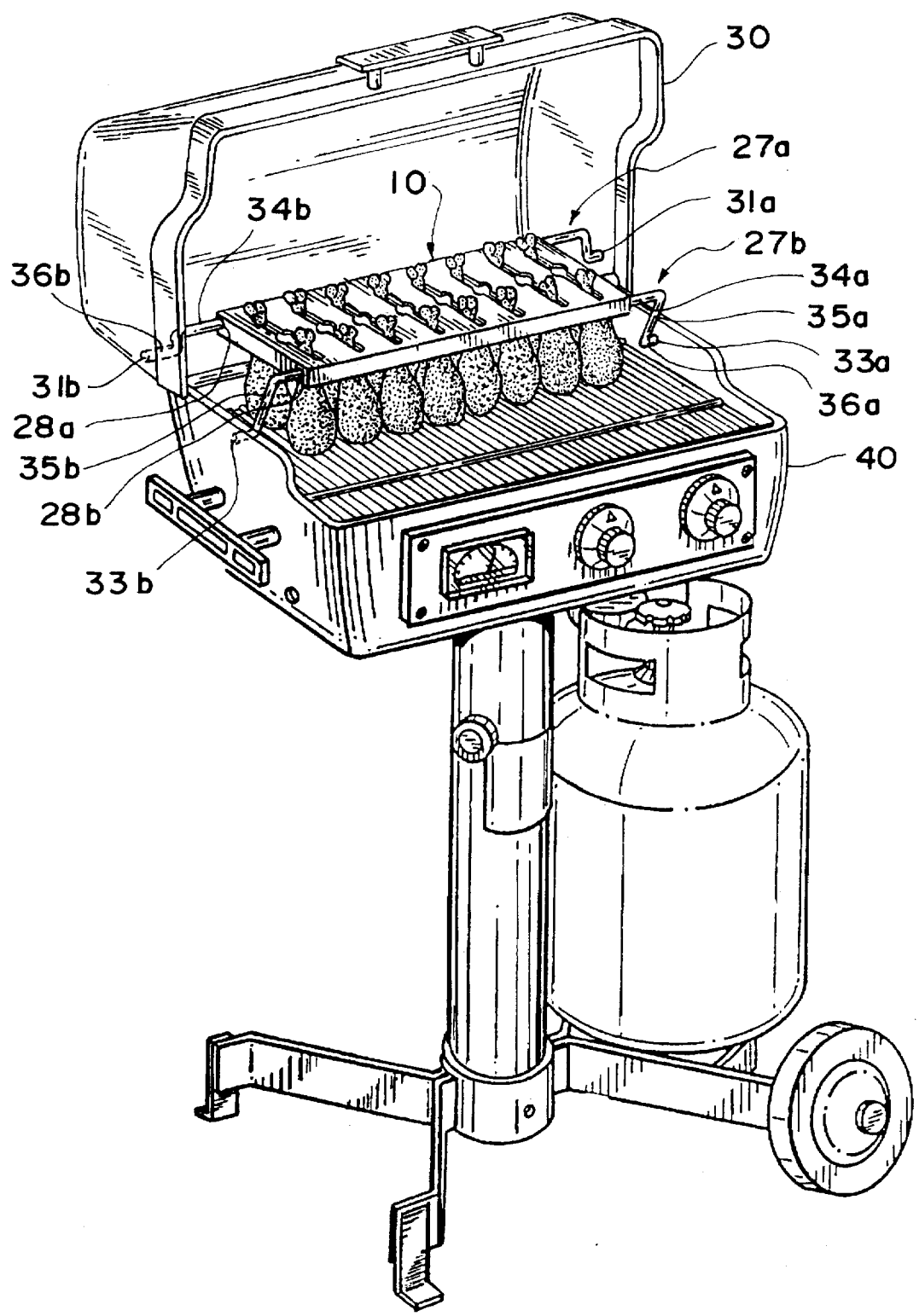

As shown in the embodiment of FIG. 4, the rack 10 is mounted to the cover 30 at pivot points 31a and 31b and the base 40 at points 33a and 33b so that the rack 10 pivots into position above the grilling surface 12 when the cover 30 is closed. The rack 10 would include pivotal bars 27a and 27b which extend through apertures 28a and 28b in the flange 26. The bars 27a and 27b each comprise an elongated portion 34a and 34b extending lengthwise beneath the rack 10, a downwardly extending portion 35a, 35b and an end portion 36a, 36b at right angles thereto.

In an optional embodiment (not shown), the apertures could be located adjacent the side of the rack 10 on the upper surface 15 or on alternately opposite sides with slots extending outwardly therefrom perpendicular to the side edge of the rack 10. Furthermore, the rack 10 could be formed of shaped wires instead of solid surfaces with adjacent wires forming the apertures 16 and the slots 17a and 17b.

In operation, a chicken leg is inserted through the aperture 16 and the leg is slid along the slot 17a or 17b where it is held in position for grilling by the joint 18. The suspended chicken leg 11 does not rest upon the grilling surface 12 and this minimizes the possibility of burning due to the intense heat of the grilling surface 12. The rack 10 positions the legs 11 at a predetermined distance above the grilling surface 12 so that the fat drippings do not cause the legs 11 to catch fire but drop harmlessly into the barbecue fire. The rising heat barbecues the chicken legs 11 in a uniform manner while preserving the outer skin which would tend to catch fire if placed upon an extremely hot surface 15. The legs 11 may be mounted in the rack 10 before placing the entire rack 10 over a barbecue for cooking purpose with the support elements 14 resting on the grilling surface 12.

Since the barbecue 13 is of conventional design, it is not discussed or described in detail herein. Normally, the rack 10, with the legs 11 in position, is placed on the grilling surface 12. The only modification to the barbecue 13 occurs in the embodiment of FIG. 4 where the rack 10 is pivotably mounted to the hood 30.

While the invention has been explained by a detailed description of certain specific embodiments, it is understood that various modifications and substitutions can be made in any of them within the scope of the appended claims which are intended also to include equivalents of such embodiments.

What is claimed, is:

1. A rack for grilling chicken legs on a barbecue with a grilling surface, having a meaty portion at one end and a leg joint at the other end comprises:

a flat elongated rack surface having parallel sides and downwardly extending flange portions and a plurality of substantially central apertures uniformly spaced longitudinally from each other, said apertures each having a slot extending diametrically outward therefrom in a parallel array wherein;

the central apertures are sufficiently sized to permit the passage of a chicken leg therethrough and the slots are sized to support the chicken legs by engaging the leg joint with said meaty leg portion extending below the flat rack surface; and, support means extending downwardly from the rack to position the legs at a predetermined distance above the barbecue grilling surface.

2. A rack for grilling chicken legs in accordance with claim 1 wherein:

the support means comprises elongated members of a predetermined length mounted at each end corner of the rack to support the chicken legs above the grilling surface and prevent burning.

3. A rack for grilling chicken legs in accordance with claim 2 wherein:

the rack comprises a plurality of spaced apertures with diametrically positioned slots extending outwardly therefrom, said slots being substantially parallel to each other and perpendicular to the sides of the rack and being narrower than a chicken leg joint.

4. A rack for grilling chicken legs in accordance with claim 1 wherein:

adjacent apertures are located alternately on opposite sides of the flat surface and a slot extends outwardly from each apertures in a spaced parallel array.

5. A rack for grilling chicken legs in accordance with claim 2 wherein:

the apertures are 2¼ inches in radius to permit a chicken leg to pass therethrough and the width of the slots is ⅝ inches to hold the chicken leg suspended therefrom by the leg joint.

6. A rack for grilling chicken legs in accordance with claim 1 wherein:

the support members comprise substantially U-shaped members including a base portion which rests on the grill and upwardly extending portions coupled to the rack.

7. A rack for grilling chicken legs on a barbecue including a base and a hood and wherein the chicken leg includes a meaty portion at one end and a leg joint at the other comprising:

an elongated rectangular rack having parallel sides and downwardly extending flange portions and a plurality of spaced apertures each having at least one slot extending outwardly therefrom in a parallel array with the other slots;

a support member extending lengthwise along the rack and having end portions at each end extending outwardly from the rack and in a predetermined angular configuration; and, wherein the end portions on one side of the rack are pivotably connected to the base and the end portions on the other side of the rack are pivotably connected to the hood so that closing the hood positions the legs in a predetermined position in the barbecue to prevent burning of the legs.

8. The method of grilling, on a barbecue grilling surface, chicken legs having a meaty portion at one end and a leg joint at the other end which comprises the steps of:

providing a rack having an upper substantially rectangular surface including a plurality of spaced lengthwise apertures and a slot narrower than the leg joint extending from each of said apertures in a parallel array and having downwardly extending support members;

inserting the meaty portion of at least one chicken leg through an aperture;

sliding the leg along the slot with the leg joint on one side of the rack and the meaty portion extending downwardly; and, placing the rack with the chicken legs held a predetermined distance above a grilling surface held in place by the support members.

* * * * *